July 30, 1968 G. E. KEEFER 3,395,008
APPARATUS FOR GLAZING GLASS ARTICLES
Filed July 1, 1965 6 Sheets-Sheet 1

INVENTOR.
GEORGE E. KEEFER
BY W. A. Schaich
and Claron N. White
ATTORNEYS

INVENTOR.
GEORGE E. KEEFER
BY *W. A. Schaich*
and *Claron N. White*
ATTORNEYS

July 30, 1968 G. E. KEEFER 3,395,008
APPARATUS FOR GLAZING GLASS ARTICLES
Filed July 1, 1965 6 Sheets-Sheet 5

INVENTOR.
GEORGE E. KEEFER.
BY W. A. Schaich
and Claron N. White
ATTORNEYS

United States Patent Office 3,395,008
Patented July 30, 1968

3,395,008
APPARATUS FOR GLAZING GLASS ARTICLES
George E. Keefer, Toledo, Ohio, assignor to Owens-Illinois, Inc., a corporation of Ohio
Filed July 1, 1965, Ser. No. 468,866
12 Claims. (Cl. 65—271)

ABSTRACT OF THE DISCLOSURE

The glass glazing apparatus disclosed herein comprises a rotary table having a portion thereof movable to a plurality of stations with a burner assembly at one of the stations. A mold is provided on the table for carrying an article beneath the burner assembly. The burner assembly comprises a plurality of burners mounted for movement radially of an article in the mold and rotationally of the mold. Cam engaging means on at least one of the burners engages cam means to cause the burners to move radially inwardly and outwardly as the burners are rotated to glaze a portion of the inner periphery of an article in the mold.

---

This invention relates to glazing glass articles and particularly to glazing glass articles to remove surface defects produced in forming glass articles by pressing.

In the pressing of glass articles, a defect that is sometimes present comprises a surface deformation. It has been conventional to fire polish such a surface defect after the article has been removed from the mold in order to eliminate the defect.

Another type of defect in pressing glass articles which are thereafter devitrified to produce a ceramic product comprises a haze or similar formation on the surface. As set forth in the copending application of Charles E. Menear, titled, Art of Producing Shaped Glass-Ceramic Articles, filed concurrently herewith and having a common assignee with the present application, such a surface defect may be removed by applying flames to the inner surfaces of a hot shaped article while the article is still in the shaping device or mold in which it was initially shaped.

It is an object of this invention to provide an improved apparatus for glazing the surfaces of glass articles.

It is a further object of the invention to provide such an apparatus wherein the surfaces are glazed while the article is still in the mold or forming surface in which it was initially formed.

Figure 1:
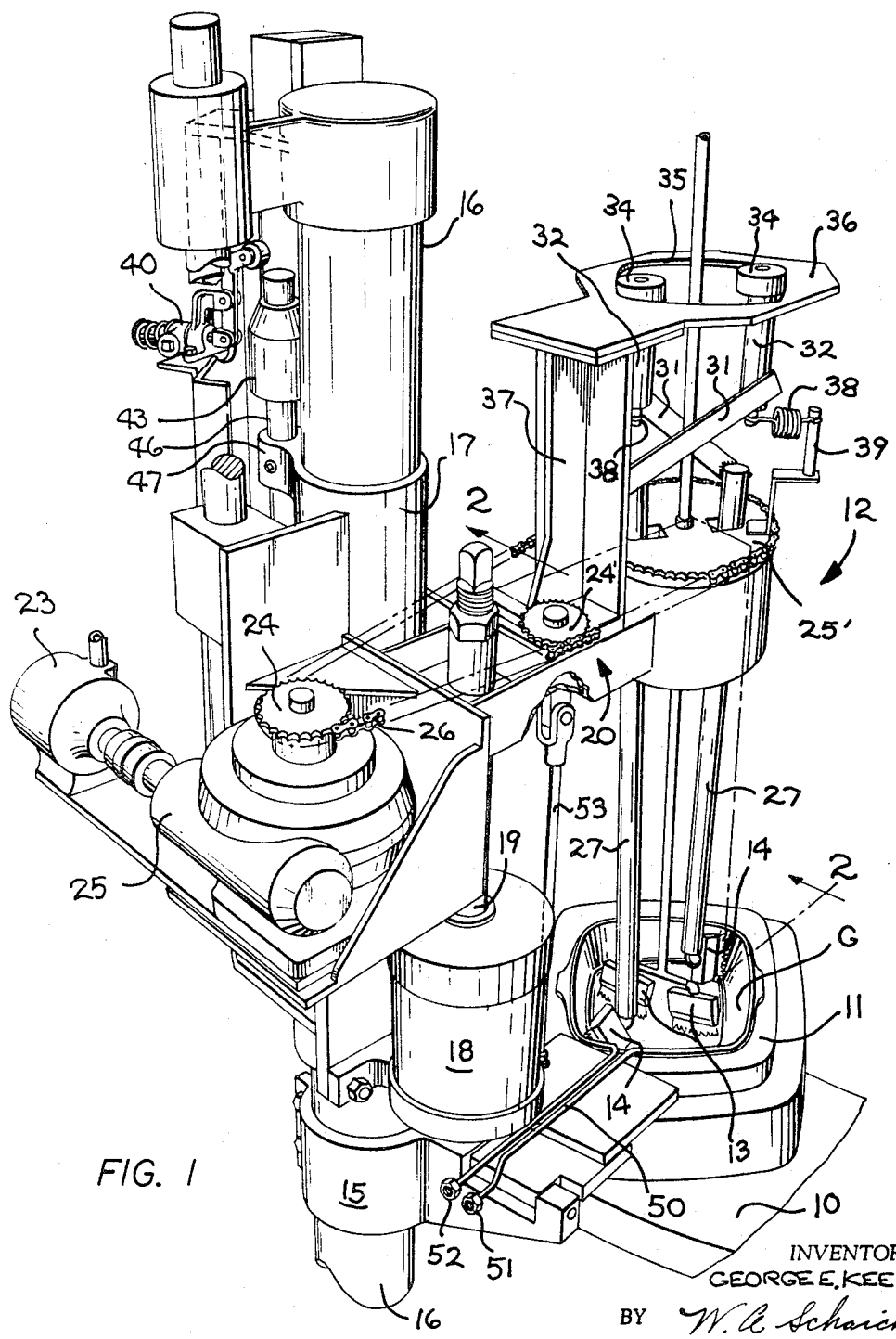
FIG. 1 is a fragmentary perspective view of an apparatus embodying the invention.

Referring to FIG. 1, the apparatus embodying the invention is adapted to be used in connection with a glass pressing machine that comprises a rotary table 10 which has one or more molds 11 thereon. The table 10 is indexed successively below a glass feeding device where a gob of glass is fed to the mold and thereafter below a pressing plunger where the plunger is moved downwardly to press and form the glass article. Such a construction is conventional.

Figure 2:
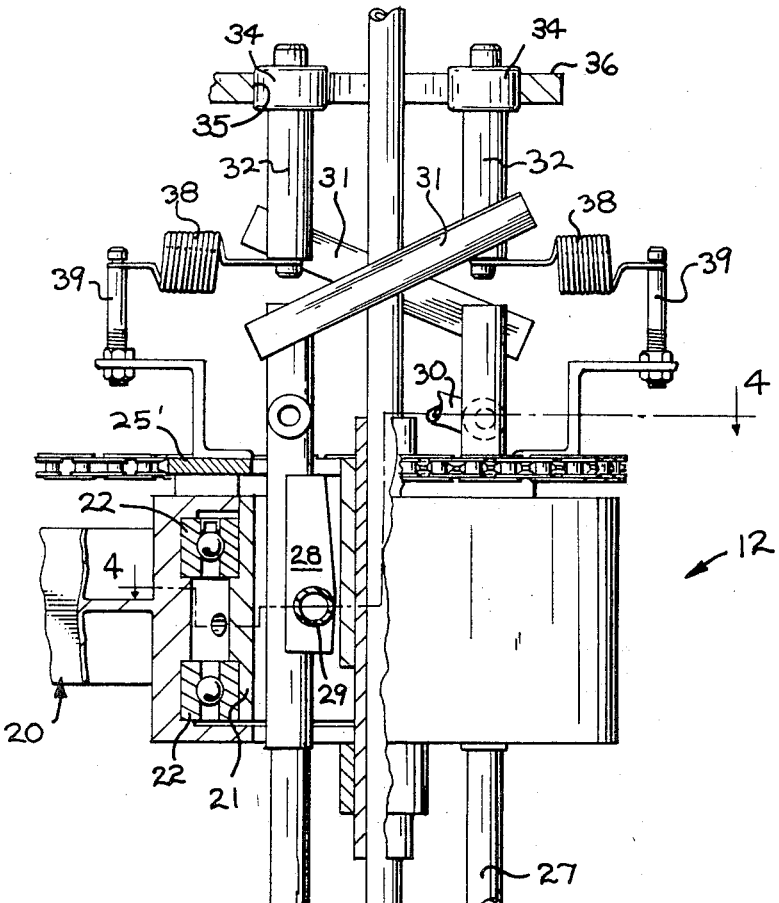
FIG. 2 is a fragmentary sectional view on an enlarged scale taken along the line 2—2 in FIG. 1.
Figure 2:
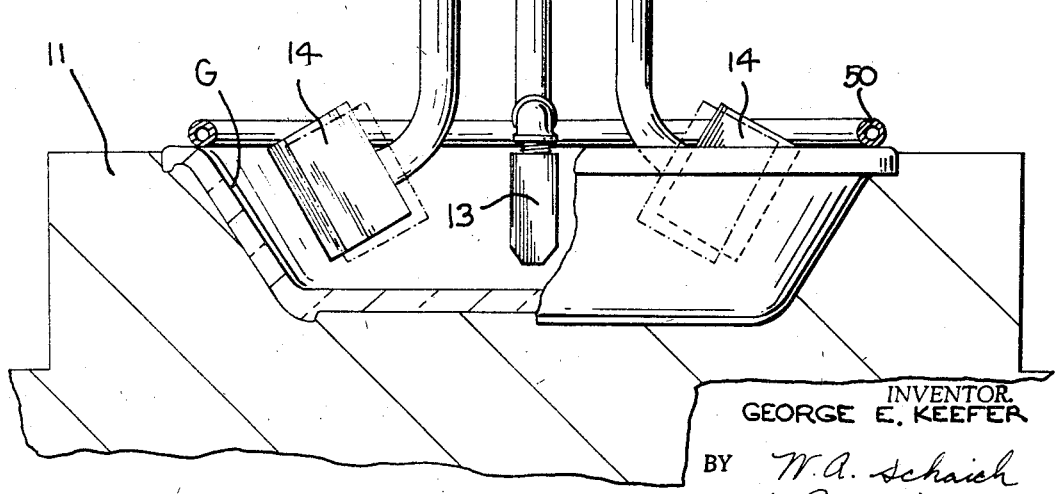
Figure 3:
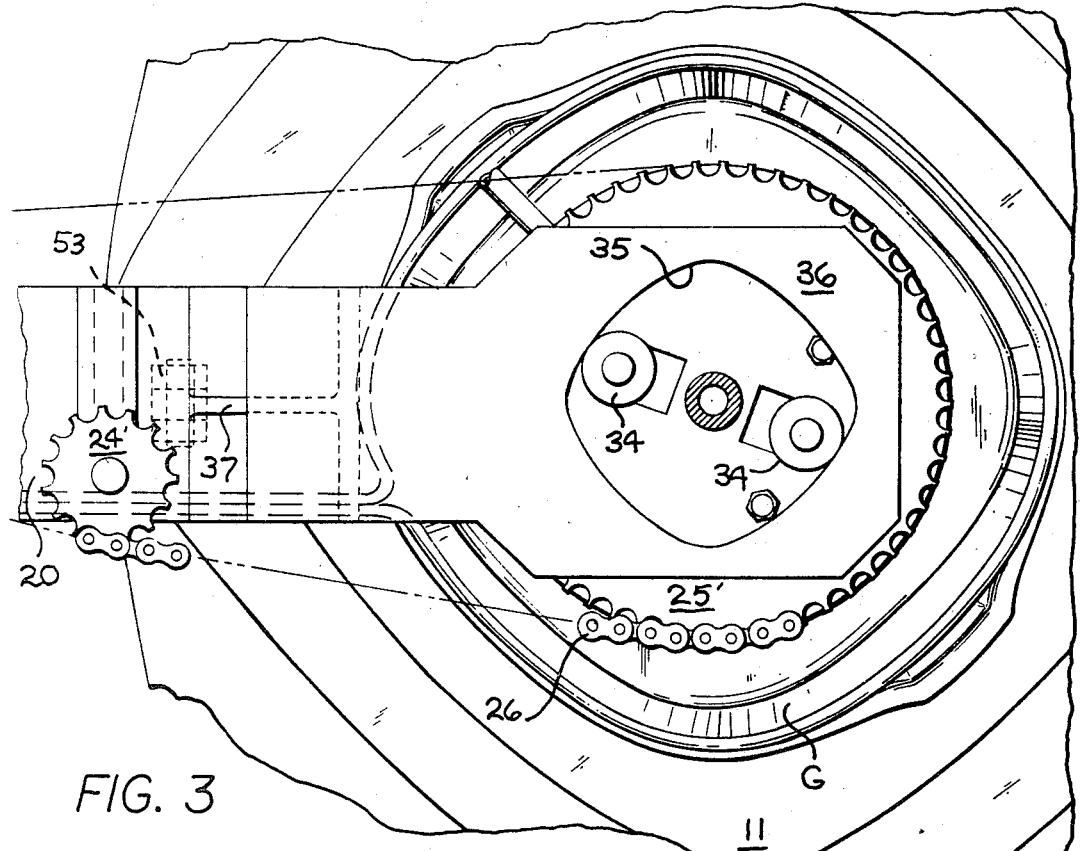
FIG. 3 is a fragentary plan view of a portion of the apparatus.

In accordance with the invention, a burner assembly 12 is positioned adjacent the periphery of the table 10 at a station preferably immediately following the pressing station while the glass article is still hot. The burner assembly 12 is adapted to move a plurality of burners 13, 14 downwardly within a glass article G, such as a deep dish, which has just been pressed in the mold 11 and to rotate the burners and move them radially inwardly and outwardly adjacent the surface of the glass article G to thereby glaze the surface (FIG. 2). As shown in FIG. 1, the glass article G is non-circular in cross section and therefore the burners 14 are moved inwardly and outwardly as they are rotated. The burners 13 apply heat in the form of flames to the bottom surface of the glass article G.

Referring to FIGS. 1 and 2, the burner apparatus 12 comprises a base 15 which is fixed on an upright post 16 adjacent the periphery of the table 10. A slide carriage 17 is slidable upwardly and downwardly on the post 16 and its position is controlled by an air cylinder 18 which has its shaft 19 connected to the frame 20 on the slide 17.

As shown in FIG. 2, the frame 20 serves as a support for a support or carriage 21 that is mounted for rotation within the support by ball bearings 22. Carriage 21 is rotated by a mechanism which includes an air motor 23 on the frame 20 which rotates a sprocket 24 through a worm and screw mechanism 25. The sprocket 25' is fixed on the rotatable carriage 21 and is rotated by a chain 26 trained over sprockets 24, 25' and an idler sprocket 24'.

As shown in FIGS. 1 and 2, each burner 14 is mounted on the lower end of a hollow shaft 27 that is pivoted intermediate its ends on the carriage 21 by a bracket 28 and horizontal pin 29.

Figure 4:
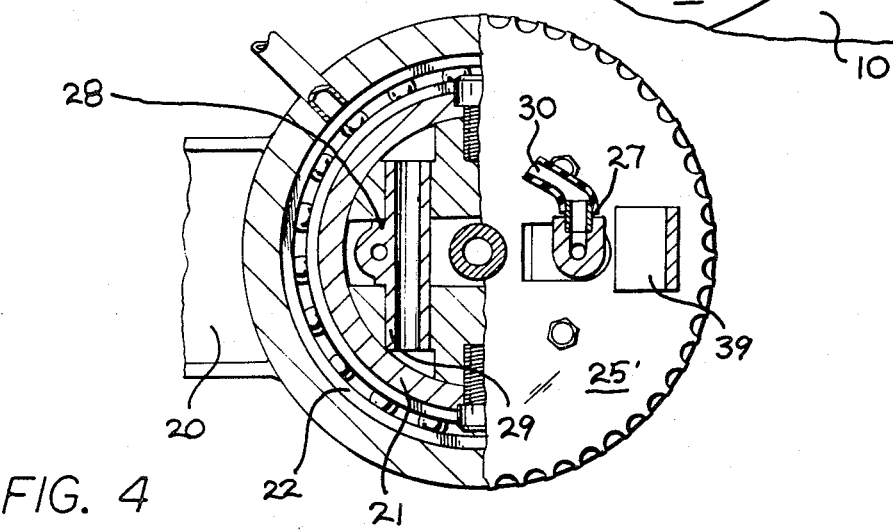
FIG. 4 is a fragmentary sectional view taken along the line 4—4 in FIG. 2.
Figure 7:
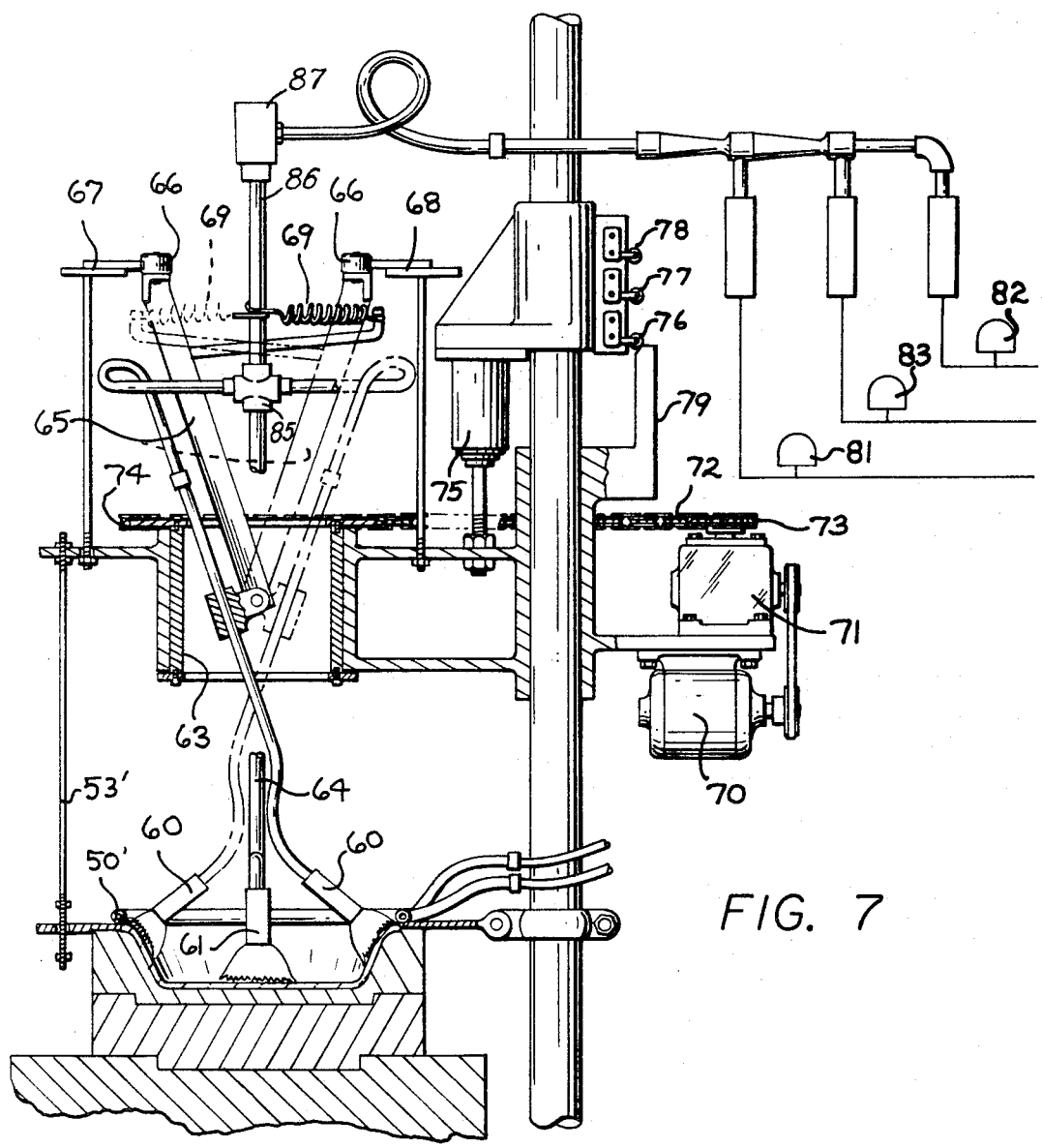
FIG. 7 is a partly diagrammatic part sectional elevation through a modified form of the apparatus.

A combustible mixture is supplied to each tubular shaft 27 through a flexible hose 30 (FIGS. 4, 7). The upper end of each shaft 27 has a cross bar 31 fixed thereto and extending upwardly and outwardly to a short shaft 32 which is fixed on the bar 31 and has a roller 34 thereon. The roller 34 bears against the internal cam surface 35 of a fixed cam 36 which is mounted on the frame 20 by a bracket 37. The configuration of the cam 36 is such as to cause the burners 14 to move radially inwardly and outwardly as the support or carriage 21 is rotated and thereby follow the contour of the skirt of the article G. In other words, the configuration of the cam 36 corresponds to the contour of the portion of the inner periphery of the article in the mold which is to be glazed so that when the burners are rotated, burners 14 follow the contour of the inner periphery of the article. A tension spring 38 extends between each shaft 32 and a bracket 39 to yieldingly hold the cam roller 34 against the cam surface 35.

Figure 5:
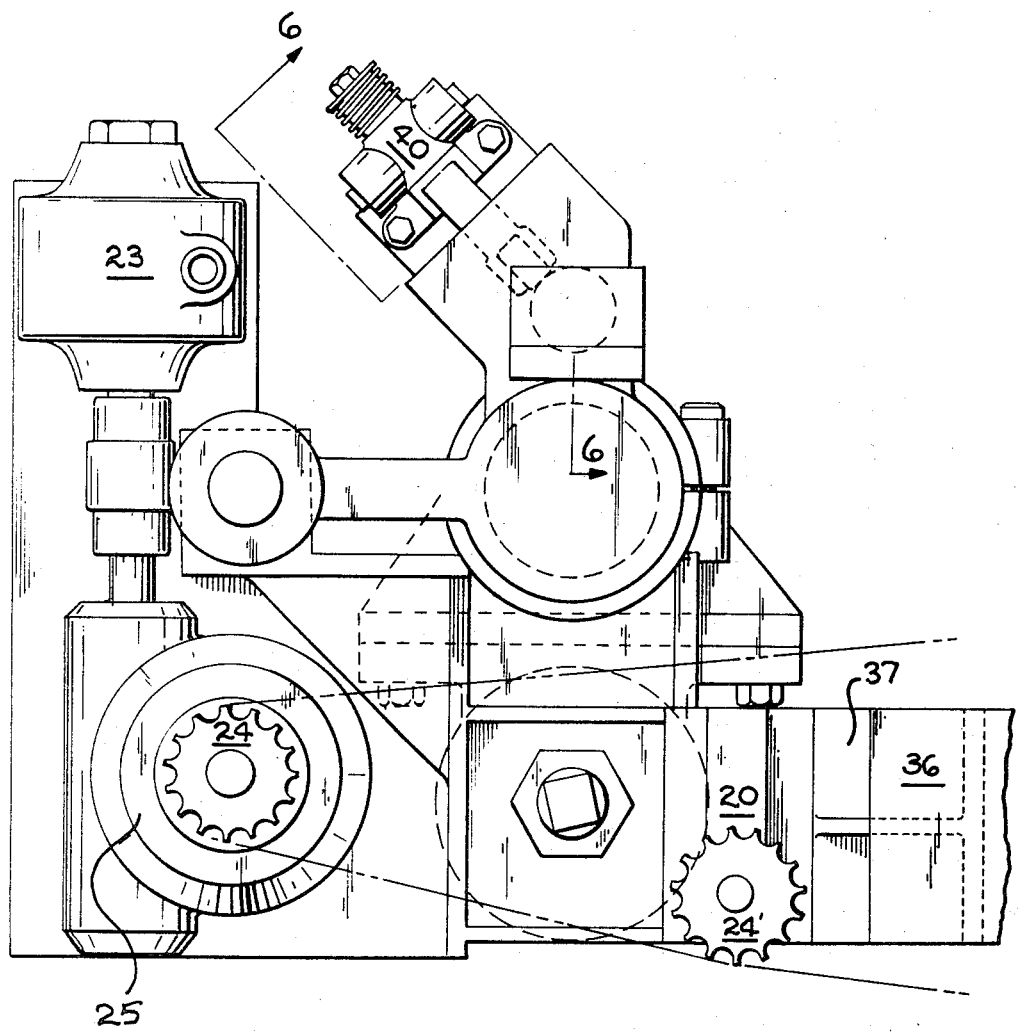
FIG. 5 is a fragmentary plan view of a portion of the apparatus shown in FIG. 1.
Figure 6:
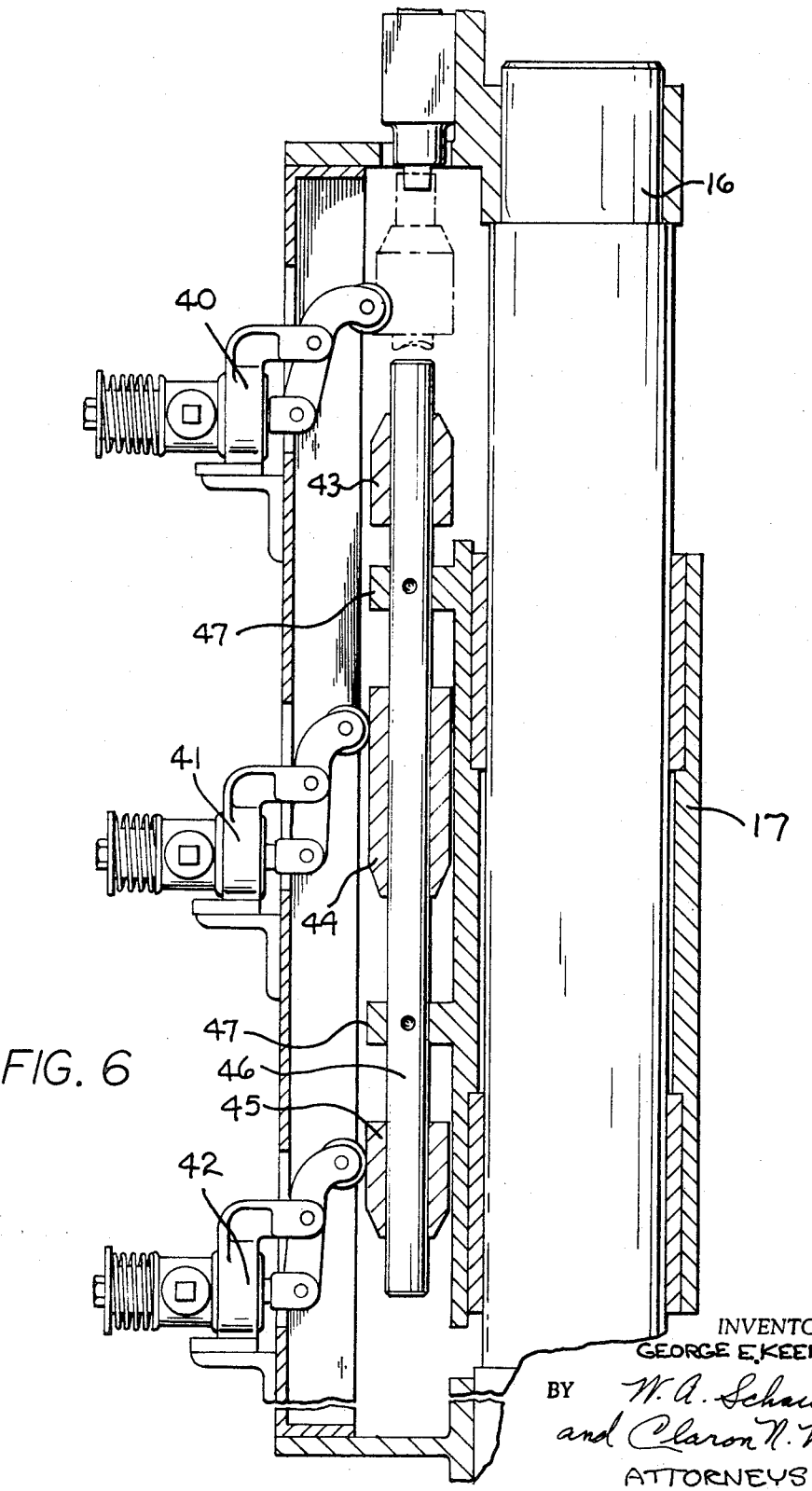
FIG. 6 is a fragmentary sectional view taken along the line 6—6 in FIG. 5.

In order to control the flow of combustible mixture to the burners 13, 14 so that the burners apply a flame only when they are in position for glazing, a plurality of valves 40, 41, 42 are provided and supported on the post 16 (FIGS. 5, 6) to control air, oxygen and fuel gas, respectively. A plurality of cams 43, 44, 45 are mounted on a rod 46 that is fixed to an extension 47 of the slide 17 and are adapted to actuate the valves 40, 41, 42 on the up and down movement of hte slide 17. The relative arrangements of the valves and their respective cams is such that on the down stroke, the air, oxygen and gas are turned on in that order, and on the up stroke, the gas, oxygen and air are turned off in that order.

In operation, as each mold 11 is brought into position adjacent the burner assembly after the glass charge therein has been pressed to form a glass article, air cylinder 18 is operated in synchronism with the movement of the mold table 10 to lower the burners 13, 14 into position and motor 23 is operated to rotate the burners 13, 14 and cause the burners 14 to follow the contour of the glass atricle G. As the burners are lowered into position, air, oxygen and fuel gas are supplied to the burners in that order. The latent heat of the hot glass article G ignites the mixture producing a flame which is impinged against the bottom surface of the glass article G by burners 13 and against the internal side surface of the skirt of the glass article G by burners 14.

In order to prevent overheating of the mold 11 that would result in the glass article G sticking in the mold 11, a cooling tube 50 is provided adjacent the upper end of the glass article in closely spaced relation thereto and liquid for cooling, such as water, is directed through the end 51 and removed through the end 52 (FIGS. 1, 2). The cooling tube 50 is supported for movement with the frame 20 by a link 53 so that the tube 50 is moved downwardly into position adjacent the article as the burners are brought into position.

The rotation and application of flames is continued and after a predetermined interval, the burners are elevated and the valves 42, 41, 40 are actuated in that order to interrupt the flow of gas, oxygen and air.

The air control is preferably arranged so that some flow of air continues in the burners even when the burners are elevated to thereby cool the burners.

The temperature of the flames from the burners 13, 14 may vary depending upon the nature of the glazing step which is to be performed. For example, in glazing articles which are to be devitrified in accordance with the aforementioned patent application of Charles E. Menear, the temperature of the flames may range between 2500°–3500° F. by changing the configuration of the cam 36, different shaped articles can be glazed.

In the form of the invention shown in FIG. 7; the burners 60 are mounted on tubes 62 pivoted to carriage 63. Burners 61 are mounted on tubes 64 fixed on carriage 63. An arm 65 is fixed to each tube 62 and a cam follower 66 on the upper end of each arm 65 engages cams 67, 68 to cause the burners to follow the contour of the glass article. A spring 69 urges each cam follower against its cam surface.

As shown in FIG. 7, the flexible lines from the burners 60 and the tube 64 from the burner 61 are connected together in a connector 85 and a pipe 86 to a swivel joint 87 that, in turn, is connected to valves 81, 82, 83 that are controlled as presently described. The flexible lines 30 and central pipe extending upwardly from burner 13 in the form of the invention shown in FIGS. 1–6 are similarly interconnected through a swivel connection.

An entirely separate motion can be achieved by providing a separate cam mounted above cams 67, 68 and cut to a different contour. With the cam followers operating against different cams two separate motions can be achieved.

In this form of the invention, the carriage is driven by a drive motor 70 acting through the belt driven speed reducer 71, drive chain 72 and sprockets 73, 74.

A lift cylinder 75 supplied with air through a timing valve, not shown, causing the entire burner assembly to be raised and lowered over the mold on the mold table.

On the up stroke of the lift cylinder 75, gas, oxygen and air to the burners is shut off by actuation of limit switches 76, 77, 78 in that order which control solenoid valves 81, 82, 83, respectively. The limit switches are actuated by limit switch cam 79. On the down stroke of lift cylinder 75, air, oxygen and gas are turned on in that order. When the combustible gas mixture discharges from the burners, heat from the pressed ware ignites the mixture. If necessary, an electric or permanent flame igniter, not shown, can be used.

Solenoid valve 83 in the air line is provided with a bypass so that a quantity of air can be passed through the burners to cool them during the off period. If desired, the solenoid valve 83 can be omitted so that full flow of air is provided for cooling during the off period. Still more cooling can be provided if necessary by installing a solenoid valve in an auxiliary air supply line, not shown, to be actuated by a normally open limit switch 78. With this arrangement, a large quantity of cooling air is supplied through the valve when the burners are off. Combustion air is supplied through the system as shown.

In summary, in both forms of the invention, the position and movement of the burners can be adjusted with respect to the center line of rotation to glaze or fire polish all or selected portions of an article. The flames are caused to closely follow the surfaces which are to be treated. By utilizing the latent heat of the article and positioning the apparatus in close proximity to the pressing station, a faster more efficient and more uniform treatment is obtained.

I claim:
1. The combination comprising:
   a rotary table having a portion thereof movable to a plurality of stations,
   a mold on said table movable with said table past a pressing station,
   a burner assembly at a station along the path of the mold beyond the pressing station,
   said burner assembly comprising:
      a support,
      a plurality of burners,
      means for mounting at least one of said burners on said support for movement radially of an article in the mold and rotationally of said support,
      cam engaging means on said mounting means,
      cam means on said support having a configuration corresponding to the contour of a portion of the inner periphery of an article in the mold and engaged by said last-mentioned means to cause said burner to move radially in and out as the burners are rotated,
      means for rotating said burners such that as they are rotated said last-mentioned burner is caused by said cam means to traverse said portion of the inner periphery of said article in the mold and move radially inwardly and outwardly to follow the inner periphery of said article.

2. A burner assembly comprising:
   a support,
   a plurality of burners,
   means for mounting at least one of said burners on said support for movement radially of an article to be treated and rotationally of said support,
   cam engaging means on said mounting means,
   cam means on said support having a configuration corresponding to the contour of a portion of the inner periphery of an article in the mold and engaged by said last-mentioned means to cause said burner to move radially in and out as the burners are rotated,
   means for rotating said burners such that as they are rotated said last-mentioned burner is caused by said cam means to traverse said portion of the inner periphery of said article in the mold and move radially inwardly and outwardly to follow the inner periphery of said article.

3. The combination set forth in claim 1 including means for moving said burner assembly into and out of position adjacent said mold as the mold reaches the station adjacent said burner assembly.

4. The combination set forth in claim 1 including means for raising and lowering said burner assembly to move said burners into and out of position with respect to said mold.

5. The combination set forth in claim 4 including means responsive to the lowering of said burners to provide a combustible mixture to said burners and responsive to the raising of said burners to interrupt the flow of combustible mixture to said burners.

6. The combination set forth in claim 1 including means for applying cooling fluid to said burners.

7. The combination set forth in claim 1 including means for producing a cooling of the periphery of the mold at said station adjacent said burner assembly.

8. The combination set forth in claim 7 including means for moving said burner assembly into and out of position adjacent said mold,
said means also moving said cooling means for said mold into and out of position.

9. The combination set forth in claim 2 including means for raising and lowering said burner assembly to move said burners into and out of position with respect to an article.

10. The combination set forth in claim 9 including means responsive to the lowering of said burner to provide a combustible mixture to said burners and responsive to the raising of said burners to interrupt the flow of combustible mixture to said burners.

11. The combination set forth in claim 2 including means for applying cooling fluid to said burners.

12. The combination set forth in claim 2 including means movable upwardly and downwardly with said support for producing a cooling of the periphery of the mold at said station adjacent said burner assembly.

References Cited
UNITED STATES PATENTS

| | | | |
|---|---|---|---|
| 1,676,796 | 7/1928 | Milar | 65—271 |
| 1,775,964 | 9/1930 | Middendorf | 65—65 |
| 3,188,190 | 6/1965 | Armstrong | 65—284 X |

DONALL H. SYLVESTER, *Primary Examiner.*

A. D. KELLOGG, *Assistant Examiner.*